No. 883,579. PATENTED MAR. 31, 1908.
G. F. SKELTON
VEHICLE SHAFT.
APPLICATION FILED NOV. 30, 1906.
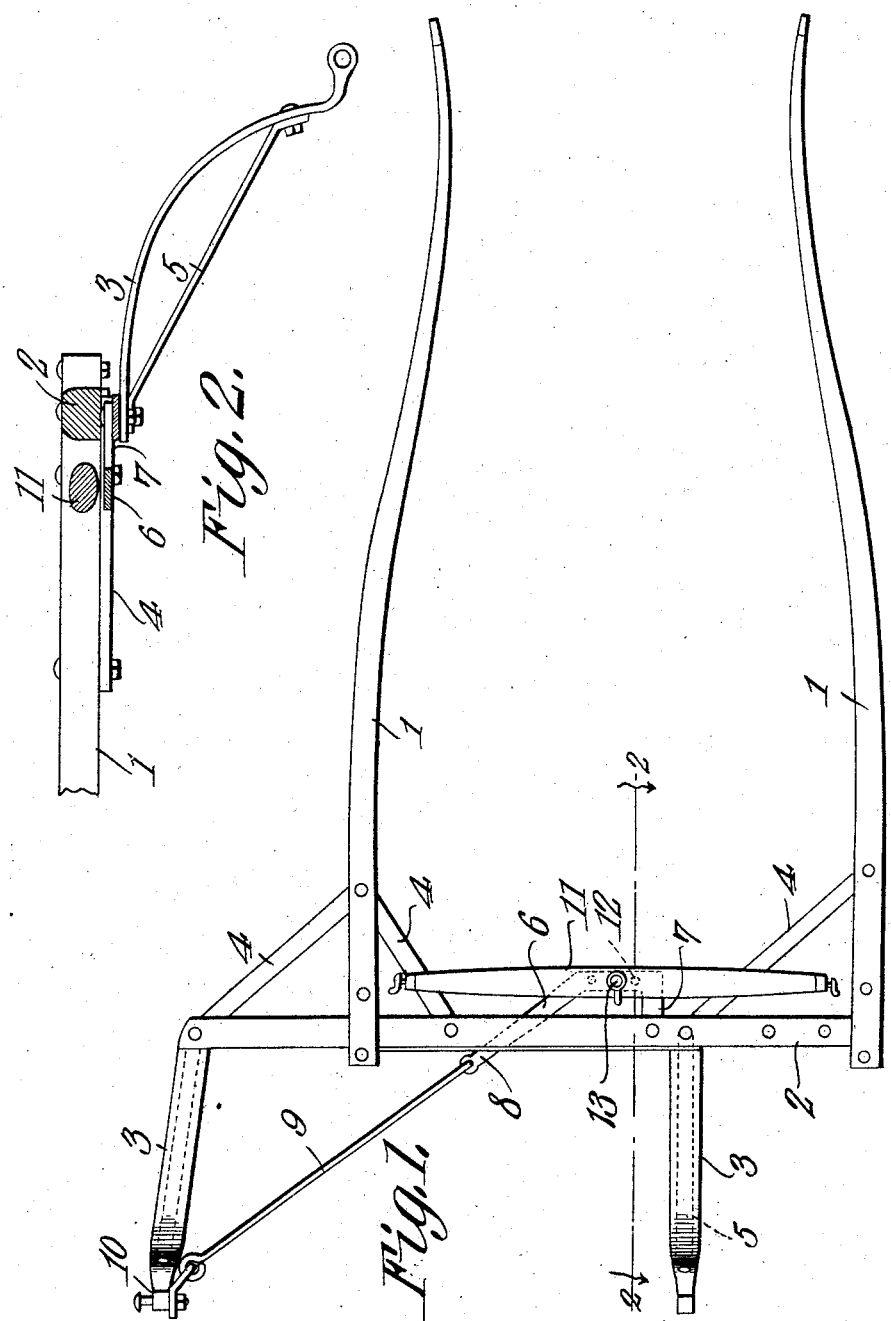
WITNESSES:
George F. Skelton, INVENTOR.
By
ATTORNEYS

UNITED STATES PATENT OFFICE.

GEORGE F. SKELTON, OF WABASSO, MINNESOTA.

VEHICLE-SHAFT.

No. 883,579.  Specification of Letters Patent.  Patented March 31, 1908.

Application filed November 30, 1906. Serial No. 345,827.

*To all whom it may concern:*

Be it known that I, GEORGE F. SKELTON, a citizen of the United States, residing at Wabasso, in the county of Redwood and State of Minnesota, have invented new and useful Vehicle-Shafts, of which the following is a specification.

This invention has relation to vehicle shafts and it consists in the novel construction and arrangement of its parts as hereinafter shown and described.

The object of the invention is to provide means by which the shafts of a vehicle, and more especially of a buggy, may be located at one side of the center of the vehicle so that the horse may walk in the track formed by one of the two horses when a team is used and thus avoid the usually rough and unpleasant ridge formed in the middle of a wagon road.

A further object of the invention is to provide such a device with means for the prevention of side draft upon the vehicle.

In the accompanying drawing:—Figure 1 is a top plan view of the shafts, and Fig. 2 is a sectional view of a portion of the same cut on the line 2, 2 of Fig. 1.

The shafts 1, 1 are fixed at their rear ends to the cross bar 2, one of the said shafts being attached to the end of the said cross bar while the other shaft is attached to the said cross bar at a point near its opposite end. The bow-irons 3, 3 are connected at their forward ends with the cross bar 2, one of the said irons being connected with the end of the said cross bar 2 opposite to that end thereof to which the shaft is attached while the end of the other bow-iron 3 is connected with the cross bar 2 at a point between the points of connection of the said shaft with the said cross bar. Braces 4, 4 extend between the shafts 1 and the cross bar 2 while the bow-irons 3 are provided with the braces 5. The lever 6 is fulcrumed to the cross bar 2, said lever having a rearwardly extending fulcrum end 7 and a rearwardly inclined end 8. The link 9 attaches at one end to the end 8 of the lever 6 and at its other end is connected with the end of one of the bow irons 3 as at 10. The swingle tree 11 is mounted upon the lever 6 and may be adjusted laterally along the same by reason of perforations 12 provided in the lever 6 which are adapted to receive the pivot bolt 13 of the said tree.

From the foregoing description it is obvious that shafts are provided which are disposed to one side of the line of draft of the vehicle and consequently permit the draft animal to follow the beaten track in the road while the wheels of the vehicle may run in the wheel ruts. Also by reason of the peculiar arrangement of the various parts side draft of the vehicle is prevented and the tree may be shifted laterally with relation to the shafts in order to even the strain upon the draft animal.

Having described my invention what I claim as new and desire to secure by Letters-Patent is:—

The combination with the shafts and cross bar, one of said shafts being attached to one end of said bar and the other shaft secured to the bar at an intermediate point thereof, bow irons connected with said cross bar, one at a point between the shafts and the other at one end of the cross bar, a lever having its intermediate portion disposed parallel with and spaced from the cross bar and one end thereof provided with an angular extension having a pivotal connection with the cross bar at a point between the bow irons, the other end of the lever extending diagonally across and beyond said bar, there being a plurality of perforations formed in the intermediate portion of the lever, a link forming a pivotal connection between the free end of the lever and the end of one of the bow irons, a swingle tree pivotally mounted on the intermediate portion of the lever, and a bolt extending through the swingle tree and one of the perforations in the lever and forming the pivotal axis of said swingle tree.

In testimony that I claim the foregoing as my own, I have hereto affixed my signature in the presence of two witnesses.

GEORGE F. SKELTON.

Witnesses:
 PAUL A. CALLAGHAN,
 K. D. BENNET.